United States Patent [19]
Hibi

[11] Patent Number: 5,383,125
[45] Date of Patent: Jan. 17, 1995

[54] SLIP CONTROL FOR AUTOMOTIVE VEHICLE WITH CONTINUOUSLY VARIABLE TRANSMISSION

[75] Inventor: Toshifumi Hibi, Yokosuka, Japan

[73] Assignee: Nissan Motor Co., Ltd., Yokohama, Japan

[21] Appl. No.: 824,246

[22] Filed: Jan. 23, 1992

[30] Foreign Application Priority Data

Jan. 23, 1991 [JP] Japan .................. 3-22933

[51] Int. Cl.⁶ .............. B60T 8/32; B60K 41/12
[52] U.S. Cl. ............... 364/426.03; 364/424.1; 180/197; 477/38
[58] Field of Search ......... 364/424.1, 426.01, 426.02, 364/426.03; 74/866; 180/197

[56] References Cited

U.S. PATENT DOCUMENTS

| | | | |
|---|---|---|---|
| 4,716,788 | 1/1988 | Kita | 74/858 |
| 4,873,639 | 10/1989 | Sato et al. | 364/426.02 |
| 4,984,161 | 1/1991 | Nakazawa et al. | 364/424.1 |
| 4,995,470 | 2/1991 | Yamaguchi et al. | 180/197 |
| 5,012,910 | 5/1991 | Miyawaki | 364/424.1 X |
| 5,047,940 | 9/1991 | Onaka et al. | 364/426.02 |
| 5,067,372 | 11/1991 | Suzuki | 74/866 |
| 5,085,104 | 2/1992 | Kouno et al. | 74/866 |
| 5,109,962 | 5/1992 | Sato | 364/426.02 X |
| 5,152,191 | 10/1992 | Sato et al. | 364/424.1 X |
| 5,178,044 | 1/1993 | Suzuki et al. | 74/866 |
| 5,218,541 | 6/1993 | Sakakibara et al. | 364/424.1 |
| 5,240,094 | 8/1993 | Suzuki | 364/426.01 X |

FOREIGN PATENT DOCUMENTS

60-192155 9/1985 Japan .

Primary Examiner—Kevin J. Teska
Assistant Examiner—Collin W. Park
Attorney, Agent, or Firm—Foley & Lardner

[57] ABSTRACT

A slip control is effected by effecting a switch to a slip control ratio change control when a wheel slip exceeds a predetermined value. The usual ratio control in a continuously variable transmission is reinstated upon completion of the slip control ratio change control smoothly owing to modification of shift speed or provision of delay.

3 Claims, 10 Drawing Sheets

SHIFT PATTERN A

FIG.6

SHIFT PATTERN B

SLIP CONTROL FOR AUTOMOTIVE VEHICLE WITH CONTINUOUSLY VARIABLE TRANSMISSION

BACKGROUND OF THE INVENTION

The present invention relates to a slip control for an automotive vehicle, and more particularly to a slip control by controlling a reduction ratio in a continuously variable transmission mounted to the vehicle.

Japanese Patent Application First Publication (JP-A) 60-192155 discloses a slip control wherein, when a wheel slip exceeds a predetermined value, a target value determined on a predetermined shift pattern is corrected to cause a drop in reduction ratio in a continuously variable transmission. Owing to a reduction in driving torque caused by the drop in reduction ratio, a wheel slip is appropriately managed.

An object of the present invention is to improve a slip control for an automotive vehicle such that a normal or usual ratio control for a continuously variable transmission is smoothly reinstated upon complection of a wheel slip ratio control without imparing a ride feel nor inducing reoccurerence of a wheel slip.

SUMMARY OF THE INVENTION

According to one aspect of the invention, there is provided a method of a slip control for an automotive vehicle including an engine, a continuously variable transmission drivingly connected to the engine, and at least one driving wheel drivingly connected to the continuously variable transmission, the method comprising the steps of:

effecting a ratio control in a continuously variable transmission to meet a predetermined operation line involving a first operation line section on which a maximum reduction ratio is to be established in the continuously variable transmission and a second operation line section on which the continuously variable transmission is continuously shiftable between reduction ratios smaller than said maximum reduction ratio;

determining a wheel slip of the driving wheel;

effecting a reduction in said maximum reduction ratio to be established on said first operation line section when said wheel slip exceeds a predetermined value;

reinstating said maximum reduction ratio to be established at said first operation line section after said wheel slip has dropped below said predetermined value; and decreasing a speed at which a shift in reduction ratio in the continuously variable transmission is effected upon a decrease in said wheel slip.

According to a specific aspect of the present invention, there is provided a method of a slip control for an automotive vehicle including an engine, a continuously variable transmission drivingly connected to the engine, and at least one driving wheel drivingly connected to the continuously variable transmission, the method comprising the steps of:

effecting a ratio control in a continuously variable transmission to meet a predetermined operation line involving a first operation line section on which a maximum reduction ratio is to be established in the continuously variable transmission and a second operation line section on which the continuously variable transmission is continuously shiftable between reduction ratios smaller than said maximum reduction ratio;

determining a wheel slip of the driving wheel;

effecting a reduction in said maximum reduction ratio to be established at said first operation line section when said wheel slip exceeds a predetermined value; and reinstating said maximum reduction ratio to be established at said first operation line section upon laspse of a predetermined period of time after said wheel slip has dropped below said predetermined value.

According to another aspect of the present invention, there is provided a system for a slip control for an automotive vehicle including an engine, a continuously variable transmission drivingly connected to the engine, and at least one driving wheel drivingly connected to the continuously variable transmission, the system comprising:

means for effecting a ratio control in a continuously variable transmission to meet a predetermined operation line involving a first operation line section on which a maximum reduction ratio is to be established in the continuously variable transmission and a second operation line section on which the continuously variable transmission is continuously shiftable between reduction ratios smaller than said maximum reduction ratio;

means for determining a wheel slip of the driving wheel;

means for effecting a reduction in said maximum reduction ratio to be established on said first operation line section when said wheel slip exceeds a predetermined value;

means for reinstating said maximum reduction ratio to be established at said first operation line section after said wheel slip has dropped below said predetermined value; and means for decreasing a speed at which a shift in reduction ratio in the continuously variable transmission is effected upon a decrease in said wheel slip.

According to a further specific aspect of the invention, there is provided a system for a slip control for an automotive vehicle including an engine, a continuously variable transmission drivingly connected to the engine, and at least one driving wheel drivingly connected to the continuously variable transmission, the system comprising:

means for effecting a ratio control in a continuously variable transmission to meet a predetermined operation line involving a first operation line section on which a maximum reduction ratio is to be established in the continuously variable transmission and a second operation line section on which the continuously variable transmission is continuously shiftable between reduction ratios smaller than said maximum reduction ratio;

means for determining a wheel slip of the driving wheel;

means for effecting a reduction in said maximum reduction ratio to be established at said first operation line section when said wheel slip exceeds a predetermined value; and means for reinstating said maximum reduction ratio to be established at said first operation line section upon laspse of a predetermined period of time after said wheel slip has dropped below said predetermined value.

DETAILED DESCRIPTION OF THE INVENTION

Figure 1:
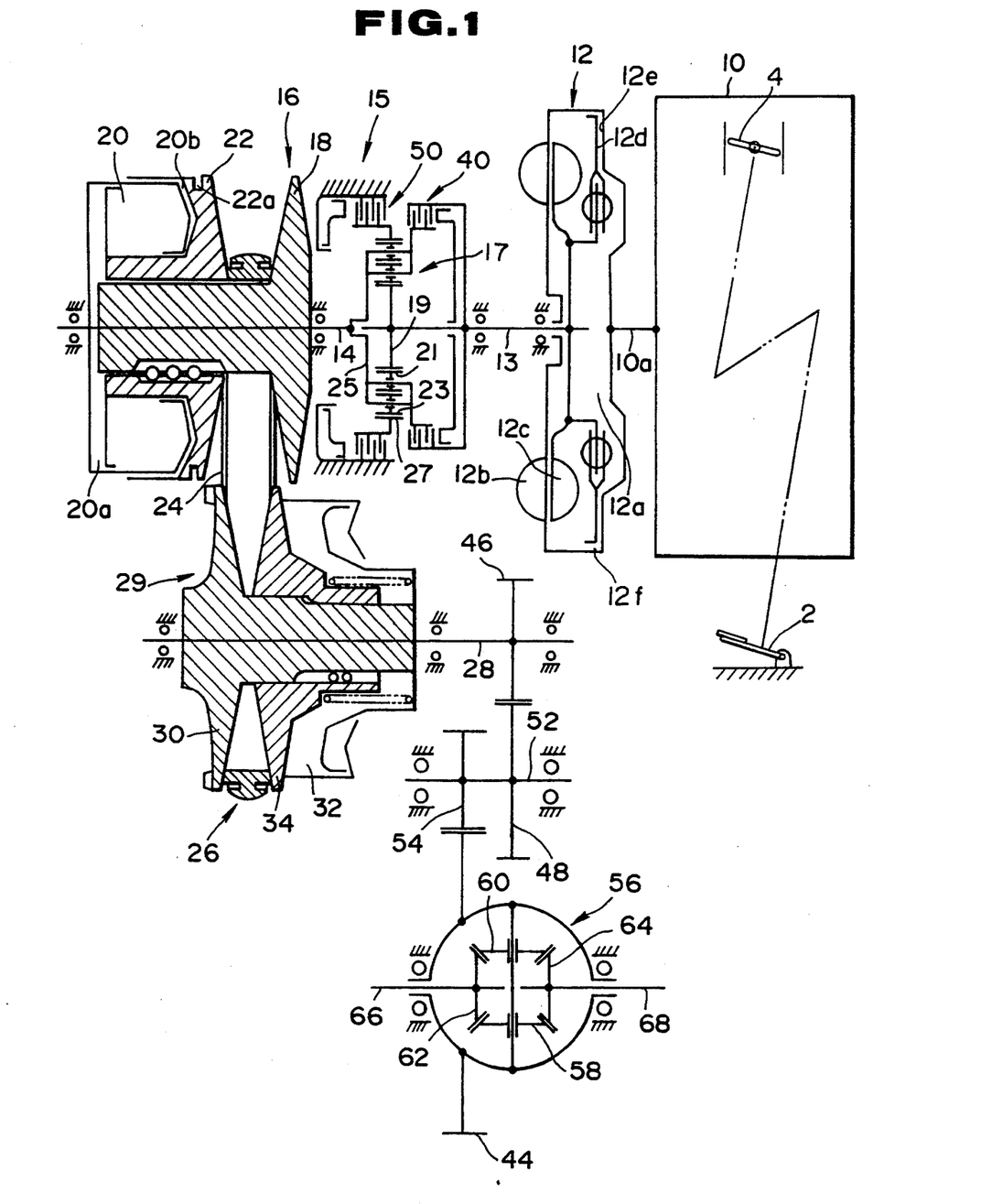
FIG. 1 shows in block diagram an internal combustion engine and a continuously variable transmission having a pair of output axles drivingly coupled with the pair of front wheels of the vehicle shown in FIG. 1A.
Figure 1A:
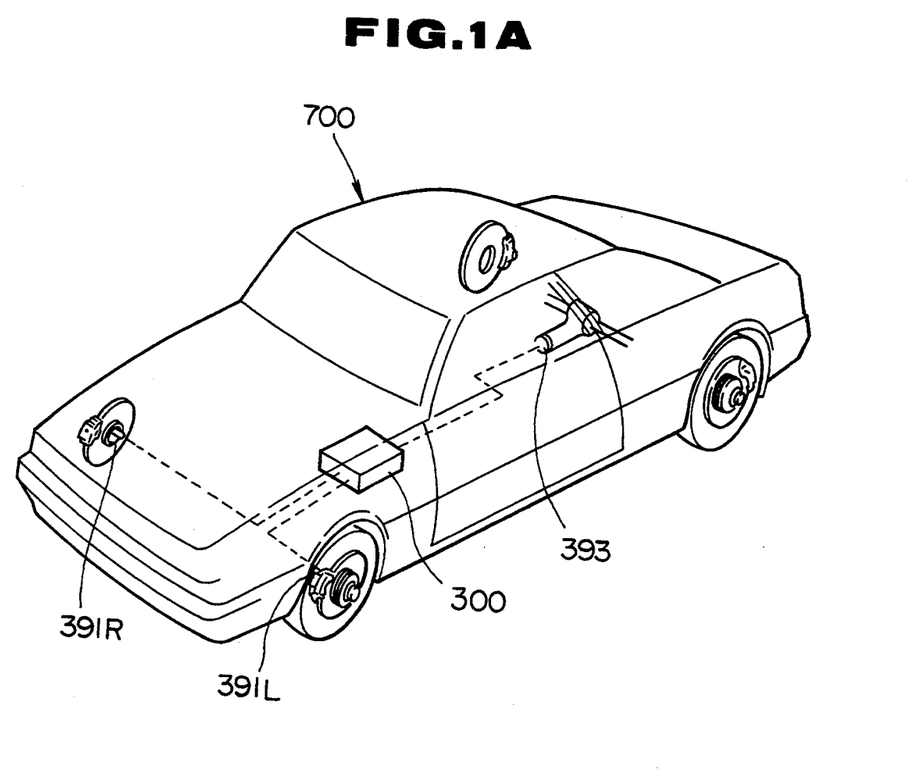
FIG. 1A is a perspective diagram of an automotive vehicle with a pair of front driving wheels and a pair of rear non-driving wheels, illustrating locations of wheel sensors.

Referring to FIG. 1A, an automotive vehicle 700 has a pair of front right and left wheels which are driven by an engine 10 via a continuously variable transmission having a pair of output axles 66 and 68 which are drivingly coupled with the pair of front wheels.

Figure 2A:
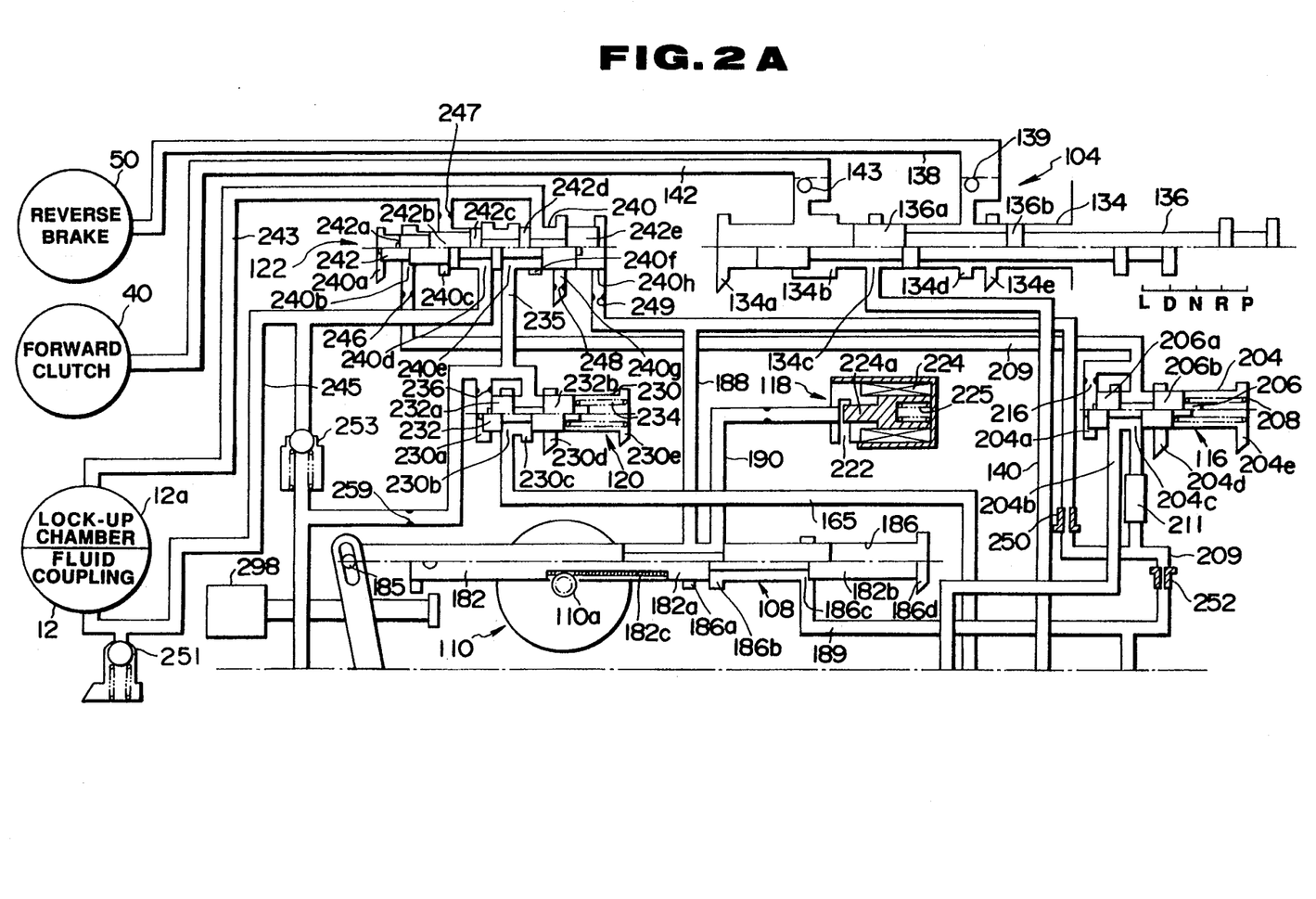
FIGS. 2A and 2B, when combined, are a hydraulic circuit of a control system for the continuously variable transmission.
Figure 2B:
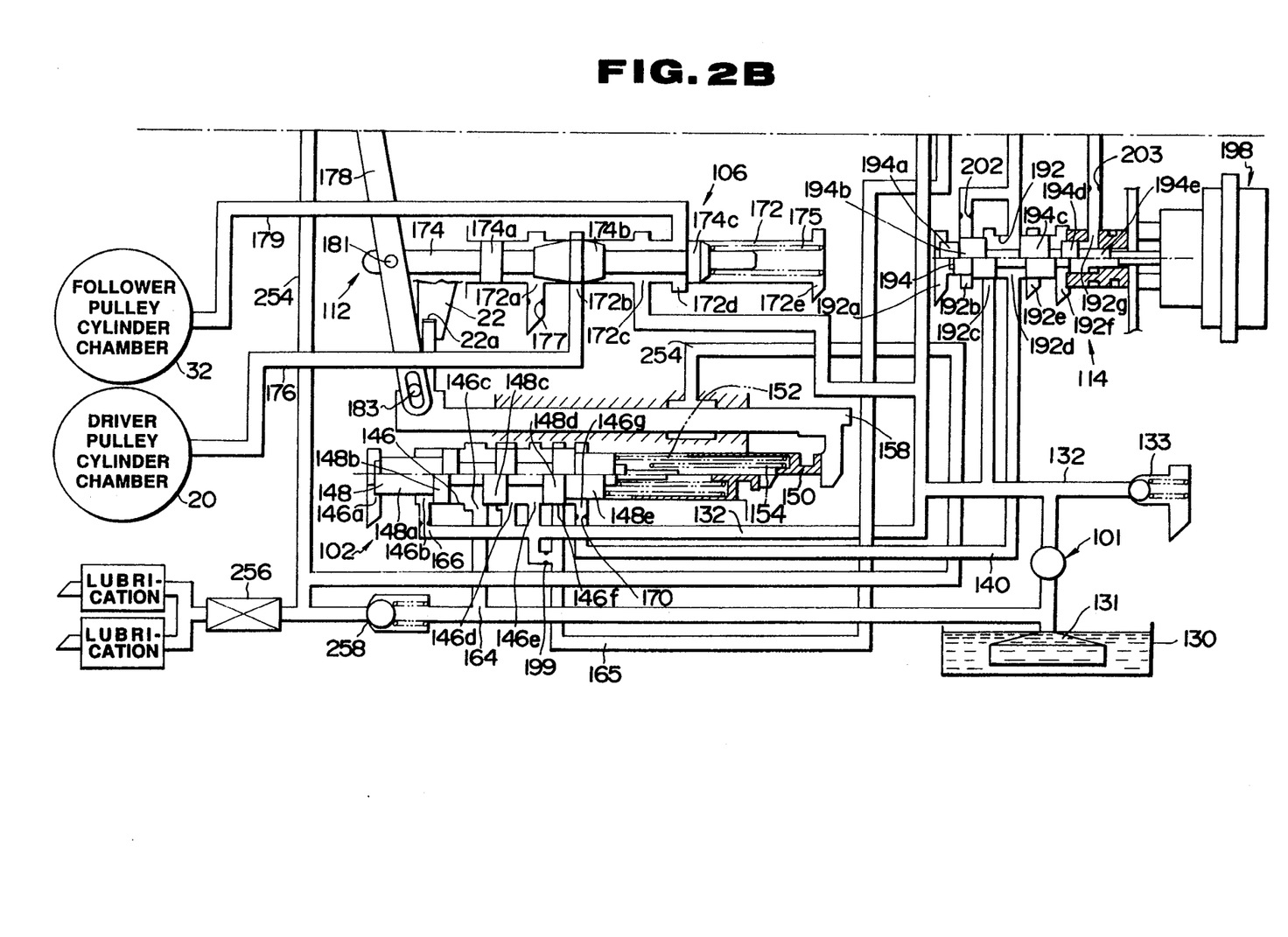
Figure 3:
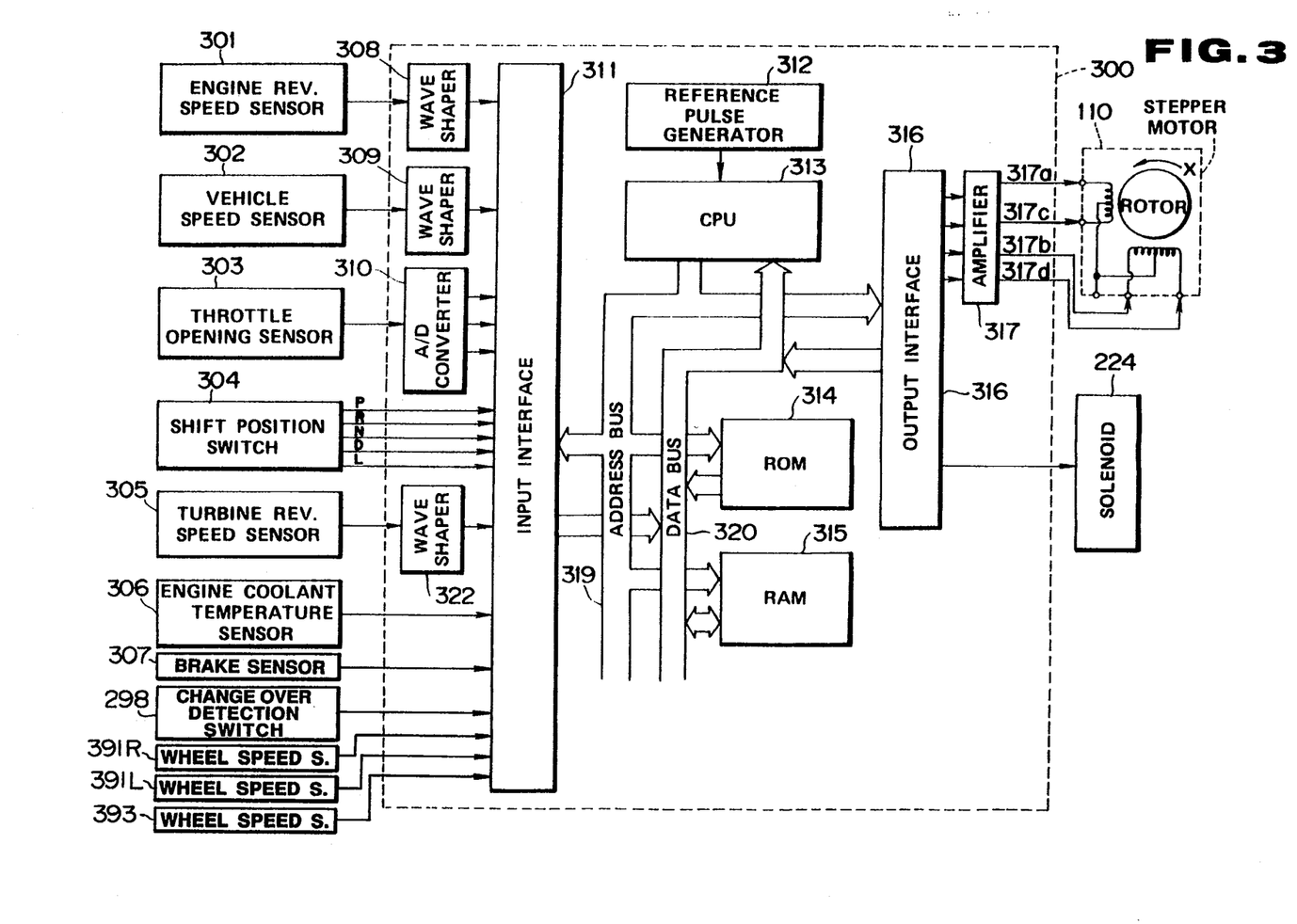
FIG. 3 is a block diagram of a control unit.

Referring to FIG. 1, the internal combustion engine 10 is followed by the continuously variable transmission of the V-belt type. Alternatively, a continuously variable transmission of the traction drive type may be used. In FIGS. 2A and 2B, there is shown a hydraulic circuit of a control system. In FIG. 3, a control unit 300 is shown which is interfaced with a pair of front wheel sensors 391R and 391L and a rear wheel sensor 393. As shown in FIG. 1A, the front wheel sensors 391R and 391L are installed on front axles, while the rear wheel sensor 393 is installed on rear axle. The control unit 300 is also shown in FIG. 1A.

Detailed description of FIGS. 1, 2A, 2B and 3 is found in a copending U.S. application Ser. No. 07/563,309 (now U.S. Pat. No. 5,067,372) filed on Aug. 7, 1990 in the name of Yutaka SUZUKI and assigned to the same assignee to which the present application is to be assigned, which copending application has been hereby incorporated by reference in its entirety.

Figure 5:
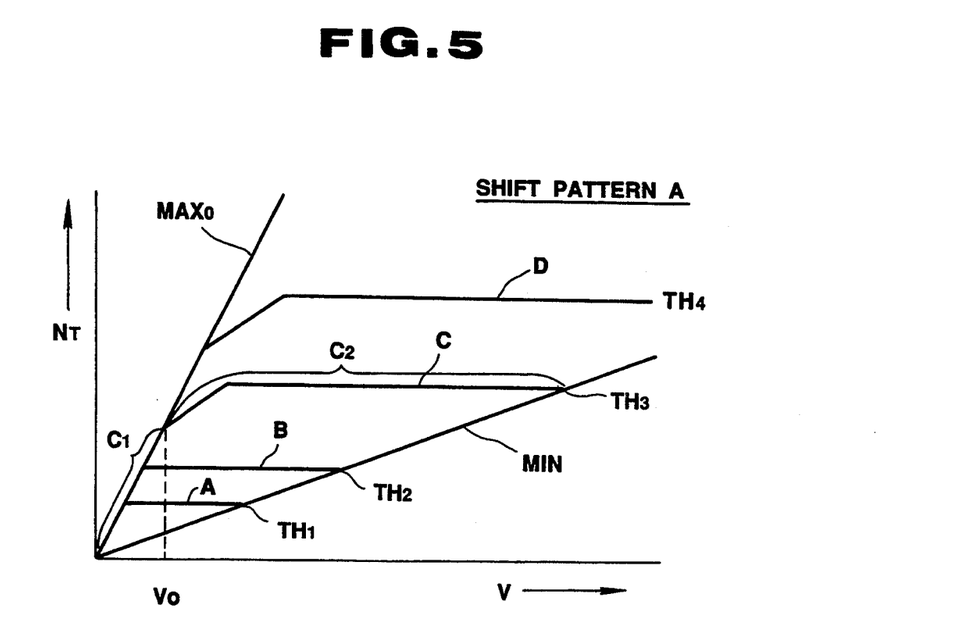
FIG. 5 is a shift pattern A.

FIG. 5 shows a shift pattern A which is usually used by the continuously variable transmission. The shift pattern A is characterized by four typical operation lines A, B, C and D drawn between a maximum reduction limit line $MAX_0$ and a minimum reduction limit line MIN. The operation line A interconnects optimum operation points with a throttle opening degree $TH_1$. Similarly, the operation line B interconnects operation points with a throttle opening degree $TH_2$ ($TH_2 > TH_1$), the operation line C with a throttle opening degree $TH_3$ ($TH_3 > TH_2$), and the operation line C with a throttle opening degree $TH_4$ ($TH_4 > TH_3$). The horizontal and vertical axes represent the vehicle speed V or the revolution speed of the output shaft of the continuously variable transmission and the target turbine revolution speed $N_T$, respectively.

Let us now consider the situation where the vehicle is to start with the throttle opening degree kept at $TH_3$. In this case, the ratio control is effected to meet the operation line C which involves a first operation line section $C_1$ on the maximum reduction limit line $MAX_1$ at which the maximum reduction ratio is to be established in the continuously variable transmission and a second operation line section $C_2$ on which the continuously variable transmission is continuously shiftable between reduction ratios smaller than said maximum reduction ratio. Immediately after the vehicle has moved from standstill, since the maximum reduction ratio is maintained, the turbine revolution speed $N_T$ increases with the vehicle speed V at a fixed ratio determined by the gradient of the maximum reduction limit line $MAX_0$. This relationship holds until the vehicle speed reaches a predetermined vehicle speed value $V_0$ at which the first operation line section $C_1$ terminates. After the vehicle speed V increases beyond $V_0$, an increase in the turbine revolution speed $N_T$ becomes gradual and thereafter the turbine revolution speed is kept substantially constant. This results from continuously variable reduction ratio change during operation on the second operation line section $C_2$.

Figure 6:
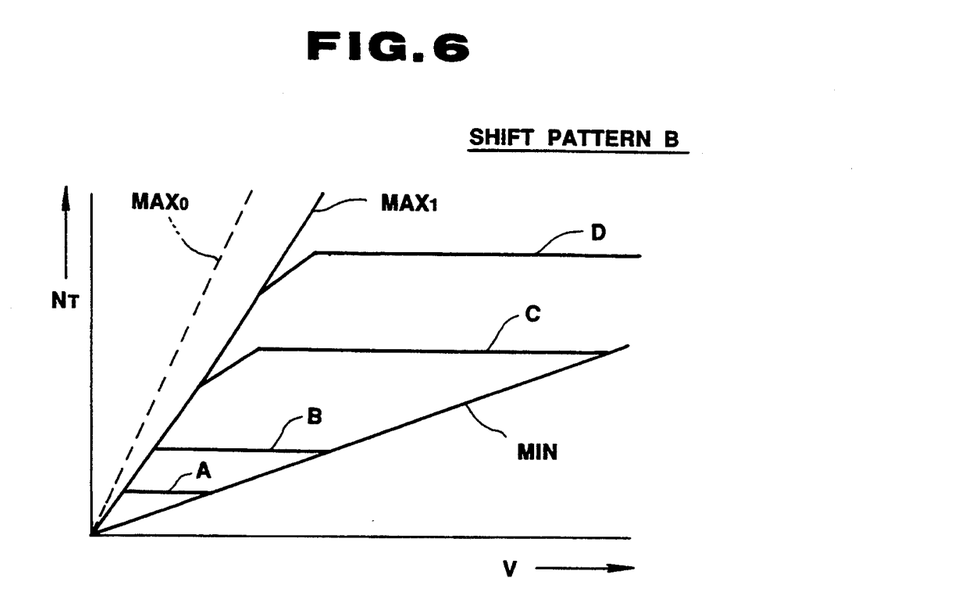
FIG. 6 is a shift pattern B.

FIG. 6 shows a shift pattern B which is to be used by the continuously variable transmission after a wheel slip R in the driving wheel exceeds a predetermined value $R_0$. In FIG. 6, the maximum reduction limit line $MAX_0$ is illustrated by broken line for comparison purpose. In the example, the shift pattern B is substantially the same as the first pattern A except that the gradient of a maximum reduction limit line $MAX_1$ is smaller than that of the previously described maximum reduction limit line $MAX_0$. Thus, the maximum reduction ratio to be established on the maximum reduction limit line $MAX_1$ is smaller than the maximum reduction ratio to be established on the maximum reduction limit line $MAX_0$. Thus, a switch to the shift pattern B when the wheel slip R exceeds $R_0$ results in a reduction in the maximum reduction ratio. Thus, even if there occurs a wheel slip in the process of start-up of the vehicle, at least an increase in the amount of wheel slip is suppressed by a decrease in reduction ratio in the continuously variable transmission. After the wheel slip R drops below the predetermined, the maximum reduction ratio is reinstated owing to a switch from the shift pattern B back to the shift pattern A. Immediately after this reinstatement of the maximum reduction ratio, there occurs a substantial change in target value in turbine revolution speed $NH_T$ which would induce a jerk if the ratio change were effected quickly. Thus, a shift in reduction ratio is effected at a predetermined speed that is lower than a normal speed after the wheel slip R has failed to increase. It is to be noted that this change in shift speed takes place regardless whether the wheel slip R drops below the predetermined value $R_0$ or not.

Figure 4:
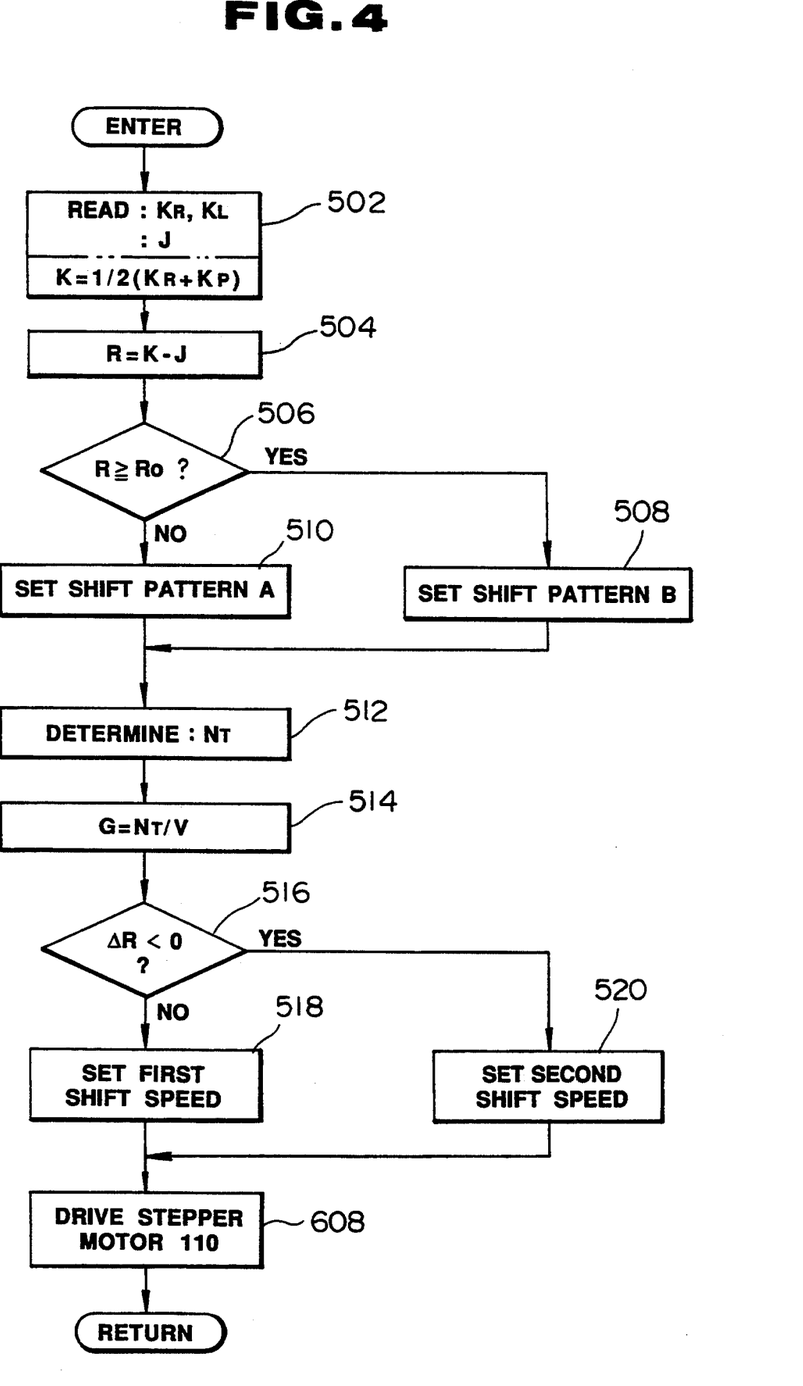
FIG. 4 is a flow diagram of a sub-routine for a slip control.

Referring to FIG. 4, there is illustrated a flow diagram of a sub-routine for effecting the above mentioned slip control. At a step 502, reading operations of the sensor outputs of the front right and rear wheels sensors 391R and 391L are performed and the results are stored as a front right driving wheel speed $K_R$ and a front left driving wheel speed $K_L$, respectively. In the same step 502, reading operation of the sensor output of the rear wheel sensor 393 is performed and the result is stored as a rear non-driving wheel speed J. Also in the step 502, an average of $K_R$ and $K_L$ is calculated and the result is stored as a driving wheel speed K. K is expressed by the following equation:

$$K = \tfrac{1}{2}(K_R + K_L) \tag{1}$$

At the next step 504, a wheel slip R is calculated. The wheel slip R is expressed by the following equation:

$$R = K - J \tag{2}$$

At a step 506, there is an interrogation whether the wheel slip R is greater than or equal to the predetermined value $R_0$. If there is no wheel slip, the routine proceeds to a step 510 where the shift pattern A shown in FIG. 5 is set for table look-up operation. At a step 512, a table look-up operation of the shift pattern which has been set is performed based on two variables, namely TH and V, to give a target value in turbine revolution speed $N_T$. At a step 514, a target reduction ratio G is given by calculating a division of $N_T$ by V. At a step 516, there is an introgation whether a change in slip delta R is negative. Since there is no wheel slip, the routine proceeds to a step 518 where a speed at which a shift in reduction ratio is effected is set. Thereafter, a step 608 is performed. At the step 608, the stepper motor 110 turns in such a direction as to bring the actual value in turbine revolution speed $N_T$ toward the target value determined at the step 512. If the wheel slip R exceeds the predetermined value $R_0$, the interrogation at the step 506 results in affirmative and the routine proceeds to a step 508 where the shift pattern B shown in FIG. 6 is set for look-up operation to be performed at the subsequent step 512. At the step 512, the table look-up operation of the shift pattern B shown in FIG. 6 is performed to give a target value in turbine revolution speed which is smaller than the target value which has been previously given in the preceding run before the wheel slip R has exceeded $R_0$. Since the shift toward this reduced reduction ratio is effected at the shift speed determined at 518, an amount of driving torque applied to the driving wheels drops, thus suppressing an increase in wheel slip R. When the wheel slip R drops below $R_0$, there occurs a switch to the shift pattern A, causing an increase in the target value in turbine revolution speed. Immediately after the wheel slip R has decreased, since the interrogation at 516 results in affirmative, a second shift speed that is lower than the first shift speed is set at a step 520 and a shift in reduction ratio toward the new target value is effected at the second shift speed and thus in a gradual manner. Owing to setting the second shift speed immediately after the wheel slip has started decreasing, the occurrence of the before-mentioned jerk which otherwise would occur is avoided.

Figure 7:
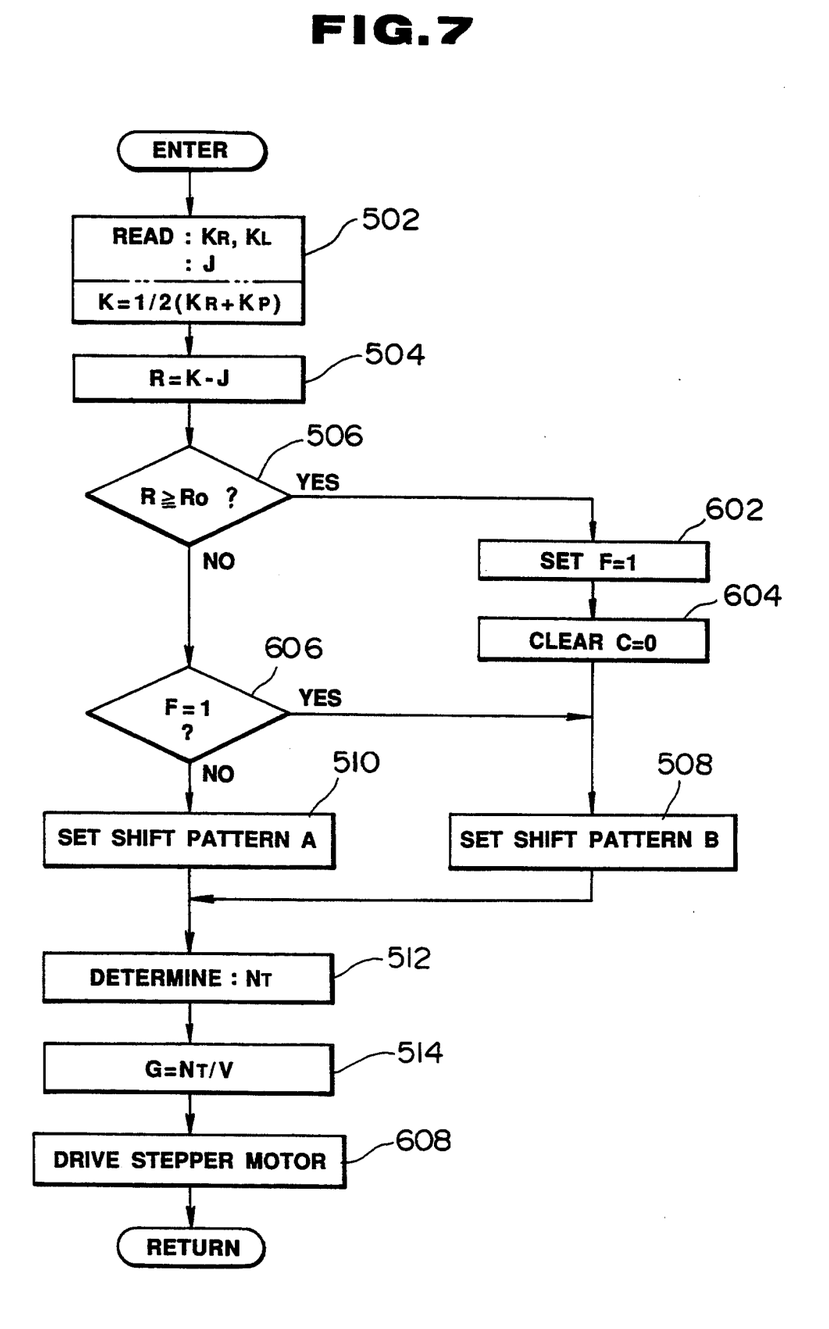
FIG. 7 is a flow diagram of a sub-routine for a slip control.
Figure 8:
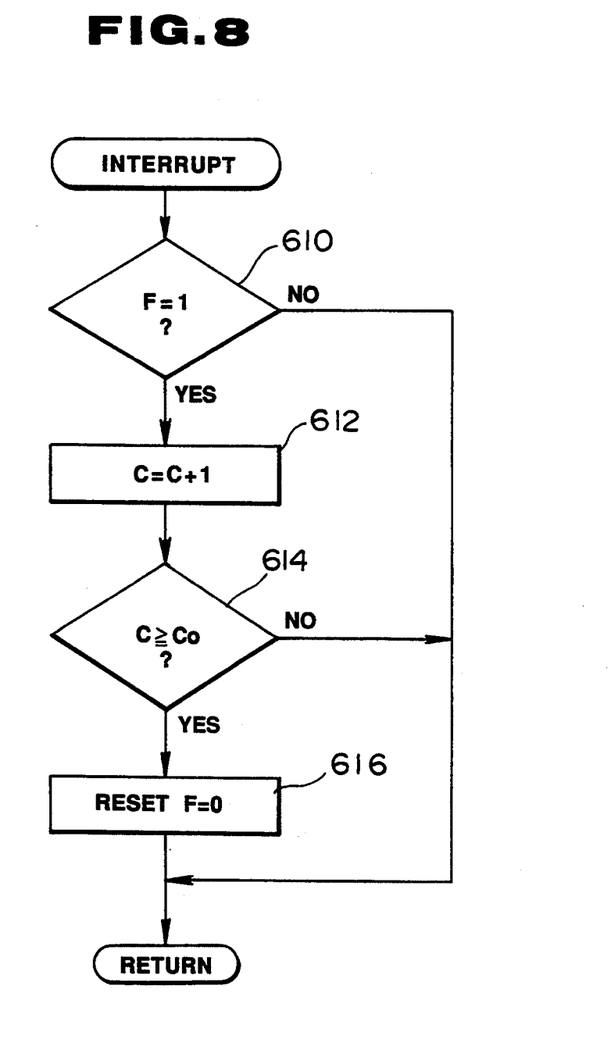
FIG. 8 is a flow diagram of an interrupt routine for incrementing of a timer.

The second embodiment is explained along with flow diagrams of sub-routines shown in FIGS. 7 and 8. FIG. 8 is a flow diagram of a time interrupt routine which is executed at regular intervals. At a step 610 in FIG. 8, there is an interrogation whether a flag F is set or not. If this is the case, the routine proceeds to a step 612 where content of timer C is incremented by one and proceeds further to a step 614. At the step 614, there is another interrogation whether or not the content of timer C is greater than or equal to a predetermined value $C_0$. If this is the case, the routine proceeds to a step 616 where the flag F is reset before proceeding to a return point. If the interrogation at 610 results in negative, the routine proceeds to the return point. If the interrogation at 612 is negative, the routine proceeds to the return point bypassing the step 616.

The sub-routine shown in FIG. 7 is explained. This sub-routine has a similarlity to the sub-routine shown in FIG. 4. Thus, like reference numerals are used to denote like steps. There is a difference as follows. In FIG. 7, the routine proceeds directly to a step 608 from a step 514, while in FIG. 4, the steps 516, 518 and 520 are provided between the steps 514 and 608. Another difference is that in FIG. 7, three new steps 602, 604 and 606 are provided downstream of a step 506 and upstream of steps 508 and 510, while in FIG. 4, the steps 508 and 510 are disposed immediately downstream of the step 506.

In FIG. 7, immediately after the wheel slip R exceeds the predetermined value $R_0$, the interrogation at the step 506 becomes affirmative and the routine proceeds to the steps 602, 604 and 508 in this order. At the step 602 the so-called slip flag F is set, and the content of timer C is cleared at the step 604. Then, at the step 508 the shift pattern B shown in FIG. 6 is set for the table look-up operation at the step 512. Subsequently, if the wheel slip R drops below the predetermined value $R_0$, the routine proceeds from the step 506 to a step 606 where there is an interrogation whether the flag F is set. Since the flag F is set until the flag F is reset at the step 616. It is seen from FIGS. 7 and 8 that the flag F is reset upon lapse of a predetermined period of time as represented by $C_0$ after the wheel slip R has dropped below $R_0$ (see step 506). Immediately after or upon elapse of the predetermined time $C_0$, the shift pattern A shown in FIG. 5 is set again for the table look-up operation to be performed at the step 512. Owing to the provision of the above-mentioned delay, there is provided enough time for the vehicle speed V and actual turbine revolution speed $N_T$ to increase sufficiently so that a deviation of the actual turbine revolution speed from the newly set target turbine revolution speed upon the switch back to the shift pattern A is small.

Preferrably, the predetermined value $C_0$ should be dependent on the peak value of the wheel slip R such that the predetermined value $C_0$ increases with an increase in the peak value of the wheel slip R.

Figure 9:
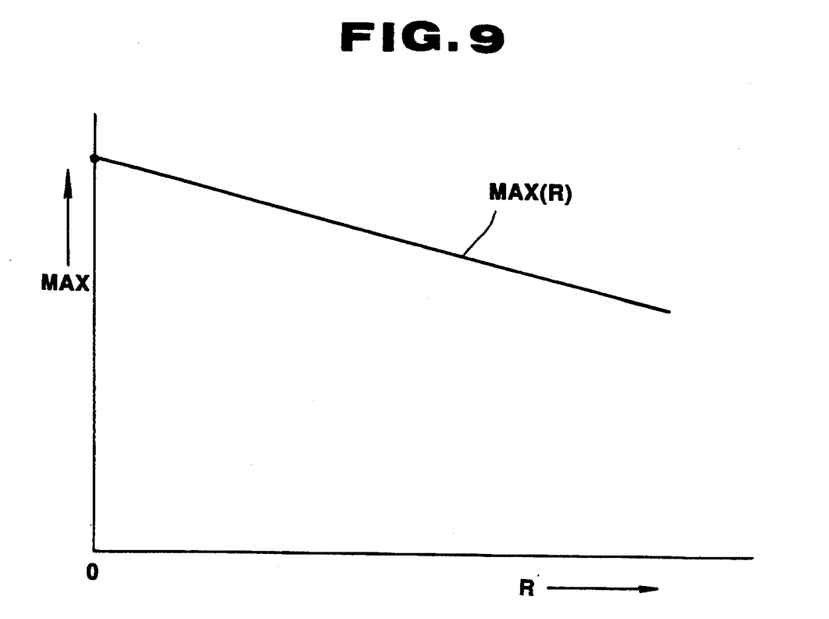
FIG. 9 is a function illustrating a preferred relationship.
Figure 10:
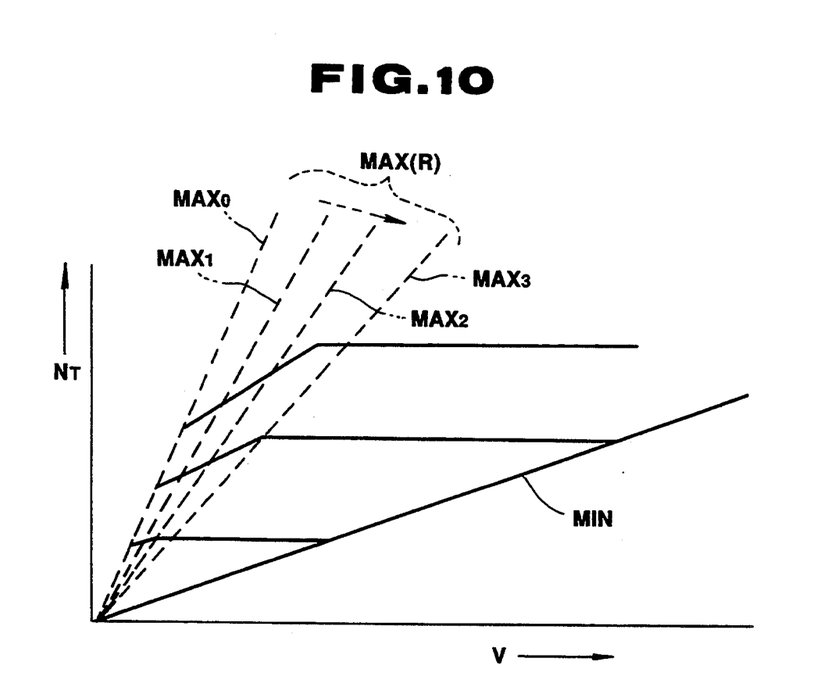
FIG. 10 shows shift patterns reflecting the function.

FIG. 9 is a function MAX(R) showing a preferred relationship between the maximum reduction ratio MAX and the wheel slip R. This means that the maximum reduction ratio MAX is in an inverse proportional relationship with wheel slip R. FIG. 10 shows shift patterns reflecting the preferred relationship as expressed by the function MAX(R) in FIG. 9.

From the preceding description, it will now be appreciated that a switch to the usual control from the control for suppressing a wheel slip is effected smoothly without imparing a ride feel nor inducing reoccurrence of a wheel slip.

What is claimed is:

1. A method of a slip control for an automotive vehicle including an engine operatively connected with a power commander, a continuously variable transmission having an input member drivingly connected to the engine and an output member, and at least one driving wheel drivingly connected to the output member, the automotive vehicle also including a pair of non-driving wheels which are free to rotate, the method comprising the steps of:

detecting a revolution speed of the input member of the continuously variable transmission and generating an actual input revolution speed indicative signal indicative of said revolution speed of the input member detected;

detecting a revolution speed of the output member of the continuously variable transmission and generating a vehicle speed indicated signal indicative of said revolution speed of the output member detected;

detecting a degree of power demand on the engine as indicated by the power commander and generating a power demand indicative signal indicative of said degree of the power demand detected;

detecting a wheel revolution speed of the driving wheel and generating a driving wheel revolution speed indicative signal indicative of said wheel revolution speed of the driving wheel detected;

detecting a wheel revolution speed of one of the pair of non-driving wheels and generating a first non-driving wheel revolution speed indicative signal indicative of said wheel revolution speed of said one of the pair of driving wheels;

detecting a wheel revolution speed of the other one of the pair of non-driving wheels and generating a second non-driving wheel revolution speed indicative signal indicative of said wheel revolution speed of said the other one of the pair of non-driving wheels;

calculating an average of said first and second non-driving wheel revolution speed indicative signals and generating an average non-driving wheel revolution speed indicative signal indicative of said average calculated;

calculating a deviation of said driving wheel revolution speed indicative signal from said average non-driving wheel revolution speed and generating a deviation indicative signal indicative of said deviation calculated;

comparing said deviation indicative signal with a predetermined reference value;

repeating execution of a first routine when said deviation indicative signal is less than said predetermined value, said first routine involving setting a first one of a plurality of shift patterns;

repeating execution of a second routine after said deviation indicative signal has become greater than or equal to said predetermined value till a predetermined condition being met subsequently, said second routine involving setting a second one of said plurality of shift patterns;

repeating execution of said first routine upon said predetermined condition being met after said deviation indicative signal having become greater than or equal to said predetermined value;

retrieving said shift pattern which has been set versus said vehicle speed indicative signal and said power demand indicative signal to give a target value in said input revolution speed and generating a target value indicative signal indicative of said target value given;

said first and second shift patterns giving first and second largest target values in said revolution speed of the input member, for each combination of vehicle speed indicative signal and power demand indicative signal, when said vehicle speed indicative signal is less than a predetermined vehicle speed value;

determining a change with respect to time in said deviation indicative signal;

determining based on said change in said deviation indicative signal whether said deviation indicative signal has decreased;

effecting a ratio change in the continuously variable transmission in such a direction as to bring said actual input revolution speed indicative signal toward said target value indicative signal at a first speed when it is determined that said deviation indicative signal has failed to decrease;

effecting a ratio change in the continuously variable transmission to bring said actual input revolution speed indicative signal toward said target value indicative signal at a second speed when it is determined that said deviation indicative signal has decreased, said second speed being lower than said first speed.

2. A method of a slip control for an automotive vehicle including an engine, a continuously variable transmission drivingly connected to the engine, and at least one driving wheel drivingly connected to the continuously variable transmission, the method comprising the steps of:

determining a wheel slip of the driving wheel;

comparing the determined wheel slip with a predetermined wheel slip value;

selecting one of a plurality of shift patterns in response to the result from comparing the determined wheel slip with the predetermined wheel slip value such that a first shift pattern is selected when the determined wheel slip is greater than the predetermined wheel slip value and a second shift pattern is selected when the determined wheel slip is greater than or equal to the predetermined wheel slip value;

calculating a change in the determined wheel slip;

determining whether the calculated change of the determined wheel slip is negative or not;

determining a first shift speed at which a shift in reduction ratio in the continuously variable transmission is effected when the calculated change of the determined wheel slip is zero or positive;

determining a second shift speed at which a shift in reduction ratio in the continuously variable transmission is effected when the calculated change of the determined wheel slip is negative; and effecting a ratio control in the continuously variable transmission based on the selected shift pattern at the first shift speed when the calculated change of the determined wheel slip is zero or positive, but at the second shift speed when the calculated change of the determined wheel slip is negative, the second shift speed being lower than the first shift speed.

3. A system for a slip control for an automotive vehicle including an engine, a continuously variable transmission drivingly connected to the engine, and at least one driving wheel drivingly connected to the continuously variable transmission, the system comprising:

means for determining a wheel slip of the driving wheel;

means for comparing the determined wheel slip with a predetermined wheel slip value;

means for selecting one of a plurality of shift patterns in response to the result from comparing the determined wheel slip with the predetermined wheel slip value such that a first shift pattern is selected when the determined wheel slip is greater than the predetermined wheel slip value and a second shift pattern is selected when the determined wheel slip is greater than or equal to the predetermined wheel slip value;

means for calculating a change in the determined wheel slip;

means for determining whether the calculated change of the determined wheel slip is negative or not;

means for determining a first shift speed at which a shift in reduction ratio in the continuously variable transmission is effected when the calculated change of the determined wheel slip is zero or positive;

means for determining a second shift speed at which a shift in reduction ratio in the continuously variable transmission is effected when the calculated change of the determined wheel slip is negative; and means for effecting a ratio control in the continuously variable transmission based on the selected shift pattern at the first shift speed when the calculated change of the determined wheel slip is zero or positive, but at the second shift speed when the calculated change of the determined wheel slip negative, the second shift speed being lower than the first shift speed.

* * * * *